(12) United States Patent
Fan et al.

(10) Patent No.: US 10,404,841 B1
(45) Date of Patent: Sep. 3, 2019

(54) MOBILE TERMINAL AND ELECTRONIC APPARATUS

(71) Applicant: GUANGDONG OPPO MOBILE TELECOMMUNICATIONS CORP., LTD., Dongguan, Guangdong (CN)

(72) Inventors: Xiaoyu Fan, Guangdong (CN); Zhengshan Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/205,594

(22) Filed: Nov. 30, 2018

(30) Foreign Application Priority Data

Feb. 9, 2018 (CN) .................... 2018 2 0234174 U

(51) Int. Cl.
*H04M 1/02* (2006.01)

(52) U.S. Cl.
CPC ....... *H04M 1/0237* (2013.01); *H04M 1/0264* (2013.01); *H04M 1/0266* (2013.01)

(58) Field of Classification Search
CPC ............. H04M 1/0247; H04M 1/0264; H04M 1/0218; H04M 1/0235; H04M 1/0237; H04M 1/0245; H04M 1/72583; H04M 2250/20; H04M 2250/52; H04M 1/0266; G06F 1/1624
See application file for complete search history.

(56) References Cited

U.S. PATENT DOCUMENTS

| | | | | |
|---|---|---|---|---|
| 2004/0198437 A1* | 10/2004 | Yamamoto | .......... | H04M 1/0237 455/556.1 |
| 2004/0229664 A1* | 11/2004 | Chadha | ............... | H04M 1/0202 455/575.1 |
| 2005/0014527 A1* | 1/2005 | Chambers | .......... | H04M 1/0264 455/556.1 |

(Continued)

FOREIGN PATENT DOCUMENTS

| | | |
|---|---|---|
| CN | 201699765 U | 1/2011 |
| CN | 106899721 A | 6/2017 |

(Continued)

OTHER PUBLICATIONS

International search report for Application No. PCT/CN2018/119865, dated Feb. 28, 2019 (4pages).

(Continued)

*Primary Examiner* — Nathan S Taylor
(74) *Attorney, Agent, or Firm* — Ladas & Parry LLP

(57) ABSTRACT

A mobile terminal including a left side face, a right side face, a front side face, a rear side face, and a top face. The mobile terminal is provided with a groove penetrating from the left side face to the right side face. The mobile terminal includes a sliding device slidable with respect to the groove, a first screen and a first camera. The first camera is arranged on the sliding device. When the sliding device carries the first camera to retract into the groove, the top wall forms at least a part of the top face, the left sidewall forms a part of the left side face, and the right sidewall forms a part of the right side face; when the sliding device carries the first camera to extend out of the groove, the first camera can be exposed out. An electronic apparatus is also provided.

20 Claims, 11 Drawing Sheets

(56) References Cited

U.S. PATENT DOCUMENTS

| | | | |
|---|---|---|---|
| 2005/0157195 A1* | 7/2005 | Ohashi | H04M 1/0214 348/333.06 |
| 2006/0044442 A1* | 3/2006 | Suh | H04M 1/0218 348/333.01 |
| 2006/0152576 A1* | 7/2006 | Kiessling | H04M 1/0256 348/14.01 |
| 2006/0166713 A1* | 7/2006 | Yeh | G06F 1/1626 455/575.1 |
| 2007/0058045 A1* | 3/2007 | Misawa | G02B 7/04 348/207.99 |
| 2007/0273786 A1 | 11/2007 | Ahn et al. | |
| 2008/0176605 A1 | 7/2008 | Choi et al. | |
| 2009/0075692 A1 | 3/2009 | Park et al. | |
| 2010/0164973 A1* | 7/2010 | Huitema | G06F 1/1615 345/581 |
| 2011/0117958 A1* | 5/2011 | Kim | G03B 35/10 455/556.1 |
| 2011/0274422 A1* | 11/2011 | Lin | G03B 17/02 396/439 |
| 2012/0014047 A1* | 1/2012 | Shibata | G03B 11/043 361/679.01 |
| 2013/0058063 A1* | 3/2013 | O'Brien | G06F 1/1624 361/807 |
| 2017/0064166 A1* | 3/2017 | Xiong | G03B 11/043 |
| 2017/0230073 A1 | 8/2017 | Youn et al. | |
| 2018/0091716 A1* | 3/2018 | Brand | H04N 5/232 |
| 2019/0014201 A1* | 1/2019 | Bao | H04M 1/0235 |

FOREIGN PATENT DOCUMENTS

| | | |
|---|---|---|
| CN | 107454216 A | 12/2017 |
| CN | 207926660 U | 9/2018 |
| EP | 3396933 A1 | 10/2018 |

OTHER PUBLICATIONS

European search report for Application No. EP18210844.9, dated Mar. 1, 2019 (7pages).

* cited by examiner

MOBILE TERMINAL AND ELECTRONIC APPARATUS

CROSS REFERENCE TO RELATED APPLICATIONS

This application claims priorities to Chinese Patent Application No. 201820234174.8, filed on Feb. 9, 2018, the contents of which are herein incorporated by reference in their entireties.

TECHNICAL FIELD

The described embodiments relate to the technical field of mobile terminals.

BACKGROUND

At present, in order to pursue a better user experience, there is an increasing demand for large-screen display of a mobile phone. However, components such as cameras and the like are typically needed to be arranged at the front of the mobile phone; these components provide limitations to the layout space of displays of the mobile phone, and a screen ratio of the mobile phone is difficult to increase.

BRIEF DESCRIPTION OF THE DRAWINGS

In order to more clearly illustrate the technical solutions in the embodiments of the present disclosure, a brief introduction will be made below to the drawings required to be used in the embodiments. Evidently, the drawings in the following description are only some embodiments of the present disclosure. A person of ordinary skilled in the art can further obtain other drawings without any creative work according to these drawings.

DETAILED DESCRIPTION

Figure 1:
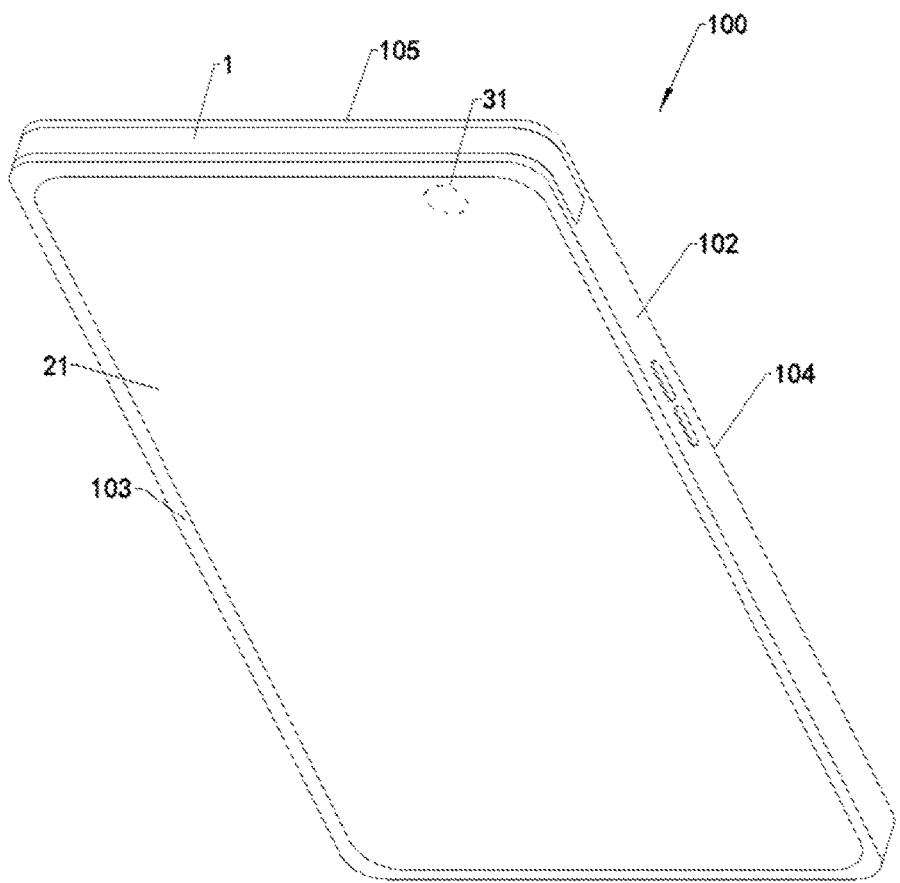
FIG. 1 is a perspective view of a mobile terminal according to one embodiment of the present disclosure.
Figure 2:
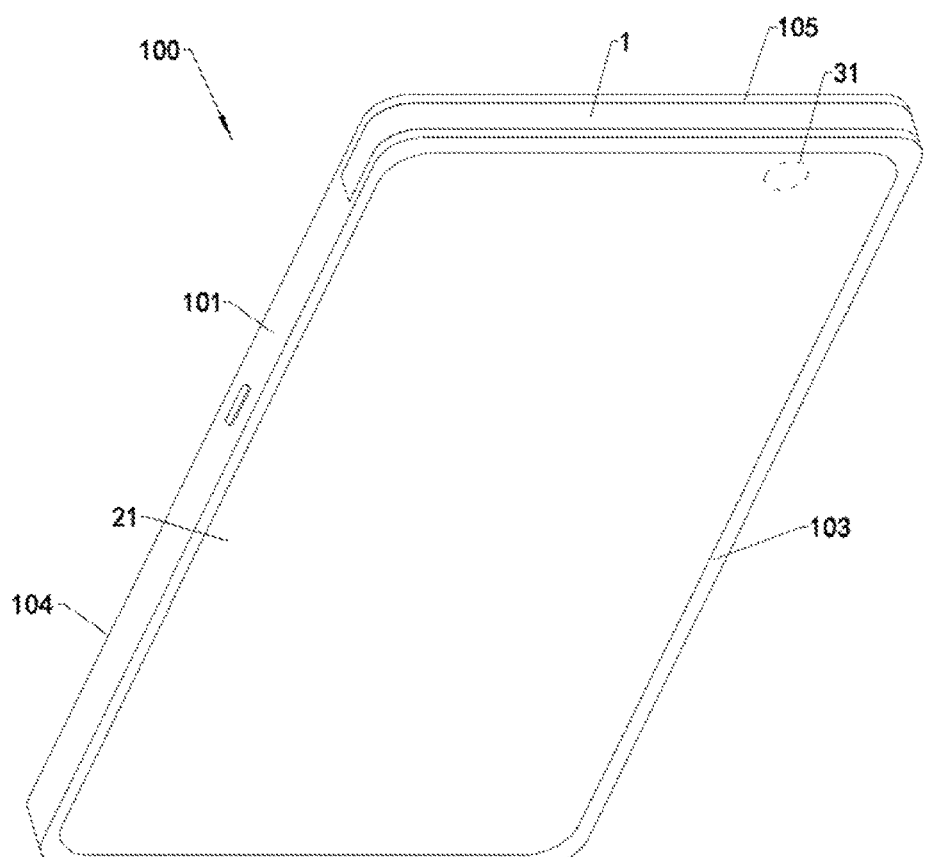
FIG. 2 is a structural view of the mobile terminal in FIG. 1 shown in another viewing angle.

Technical solutions in the embodiments of the present disclosure will be described below with reference to the accompanying drawings in the embodiments of the present disclosure. Apparently, the embodiments described below are merely some of the embodiments of the present disclosure, rather than all of the embodiments. All other embodiments obtained by those skilled in the art without creative efforts on the basis of the embodiments of the present disclosure shall fall within the protection scope of the present disclosure.

Furthermore, in the description of the embodiments of the present disclosure, the description of the following embodiments is provided with reference to the accompanying drawings for illustrating specific implementations which may be implemented in the present disclosure. Directional terms recited in the present disclosure, such as "top", "bottom", "upper", "lower", "front", "rear", "left", "right", "inner", "outer", "side", and the like, refer to the orientations in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure.

In the present disclosure, it should be noted that, unless specified or limited, otherwise, terms "mounted", "connected", "coupled", "disposed", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the description of the present disclosure, it should be noted that, "a plurality of" means two or more, unless specified otherwise. If the term "process" appears in this specification, it means not only an independent process, but also when it is not clearly distinguishable from other processes, it is included in the term as long as the intended function of the process can be realized. In addition, the numerical range represented by "to" in the present disclosure is a range in which the numerical values described before and after "to" are respectively included as a minimum value and a maximum value. In the drawings, elements that are similar or identical in structure are denoted by the same reference numerals.

In the present disclosure, a communication terminal configured to communicate by means of a wireless interface may be referred to as a "wireless communication terminal", a "wireless terminal", or a "mobile terminal". As used herein, a "communication terminal" (or simply "terminal") includes, but is not limited to, an apparatus receiving/transmitting communication signals via wired connection (for example, via a public switched telephone network (PSTN), a digital subscriber line (DSL), a digital cable, a direct cable, and/or another data connection/network), and/or via a wireless interface (for example, the wireless interface for a cellular network, a wireless local area network (WLAN), a digital television network such as DVB-H network, a satellite network, a AM-FM broadcast transmitter, and/or another communication terminal). Examples of the mobile terminal include, but are not limited to, a satellite or cellular telephone; a personal communication system (PCS) terminal that can combine a cellular radio telephone with functions of data processing, fax, and data communication; a radio telephone, a pager, an internet/intranet access, a web browser, a notepad, a calendar, and/or a global positioning system (GPS) receiver personal digital assistant (PDA); and a conventional laptop, and/or a palmtop receiver or other electronic apparatuses including radio telephone transceivers.

Referring to FIGS. 1-4, a mobile terminal 100 is provided in the present disclosure. The mobile terminal 100 may include a left side face 101, a right side face 102, a front side face 103, a rear side face 104, and a top side face 105. The left side face 101 may be disposed opposite to the right side face 102. The front side face 103 may be disposed opposite to the rear side face 104. The front side face 103 may be connected between the left side face 101 and the right side face 102. The rear side face 104 may be connected between the left side face 101 and the right side face 102. The top face 105 may be connected between the front side face 103 and the rear side face 104, and further connected between the left side face 101 and the right side 102.

A receiving groove 10 may be defined in the mobile terminal 100. The receiving groove 10 may be located between the front side face 103 and the rear side face 104, and penetrate through from the left side face 101 to the right side face 102. The mobile terminal 100 may include a sliding device 1. The sliding device 1 may be retractable and slidable with respect to the receiving groove 10. The sliding device 1 may include a left sidewall 11, a right sidewall 12, a front sidewall 13, a rear sidewall 14, and a top wall 15. The left sidewall 11 may be disposed opposite to the right sidewall 12. The front sidewall 13 may be connected between the left sidewall 11 and the right sidewall 12. The rear sidewall 14 may be connected between the left sidewall 11 and the right sidewall 12. The top wall 15 may be connected between the left sidewall 11 and the right sidewall 12, and further between the front sidewall 13 and the rear sidewall 14.

The mobile terminal 100 may include a first screen 21 and a first camera 31. The first screen 21 may be disposed on the front side face 103. The first camera 31 may be disposed on the sliding device 1. When the sliding device 1 carries the first camera 31 to retract into the receiving groove 10, the top wall 15 may form the whole top face 105 or a part of the top face 105, that is to say, the top wall 15 may form at least a part of the top face 105. The left sidewall 11 may form a part of the left side face 101, and the right sidewall 12 may form a part of the right side face 102. When the sliding device 1 carries the first camera 31 to extend out of the receiving groove 10, and an image capturing surface of the first camera 31 can be exposed out of the receiving groove 10. At this time, photographing may be performed with the first camera 31.

In the present embodiment, the sliding device 1 can carry the first camera 31 to retract into or extend out of the receiving groove 10; in this way, when the photographing is needed, the sliding device 1 may carry the first camera 31 to extend out of the receiving groove 10 to take a picture; when the photographing is not needed, the sliding device 1 may carry the first camera 31 to retract into the receiving groove 10. Therefore, the first camera 31 does not need to occupy the space on the front side face 103 of the mobile terminal 100, and the first screen 21 may be arranged as large as possible on the front side face 103, such that the screen ratio of the mobile terminal 100 may be relatively high.

For example, the screen ratio of the mobile terminal 100 may be as high as 85% or even 95%. The screen ratio may refer to a display area of the screen of the mobile terminal 100 (such as the first screen 21) and a projection area of the mobile terminal 100 as a whole in a plane perpendicular to a thickness direction of the mobile terminal 100.

In the present embodiment, the first camera 31 may be retracted into the inside of the mobile terminal 100 when not in use, in order to obtain protection from the peripheral structure, and may be extended out of the mobile terminal 100 for photographing as required. In this way, the problems of wear, dust entering, and the like due to a long-term exposure may be avoided, and the quality of photographing of the first camera 31 may be effectively ensured. Since the receiving groove 10 penetrates through from the left side face 101 to the right side face 102, the receiving groove 10 may have a large volume, and may be easily processed. The appearance and shape of the mobile terminal 100 may keep consistent. Similarly, since the receiving groove 10 have a large volume, a volume of the sliding device 1 that cooperates with the receiving groove 10 can also be set larger, so that the sliding device 1 may receive more functional components. In this way, the arrangement of the functional components of the mobile terminal 100 may be more flexible and diverse.

It can be understood that, "the image capturing surface of the first camera 31 can be exposed out" means that the image capturing surface of the first camera 31 will not be blocked by any component of the mobile terminal 100 that may have a light blocking effect (for example, a screen, and the like), so that the photographing may be performed successfully. Of course, it is also allowed that a light-transmitting lens and the like may cover the image capturing surface of the first camera 31, in order to protect the first camera 31.

In this case, the first screen 21 may be a liquid crystal display (LCD) or an organic light-emitting diode (OLED) display.

Figure 3:
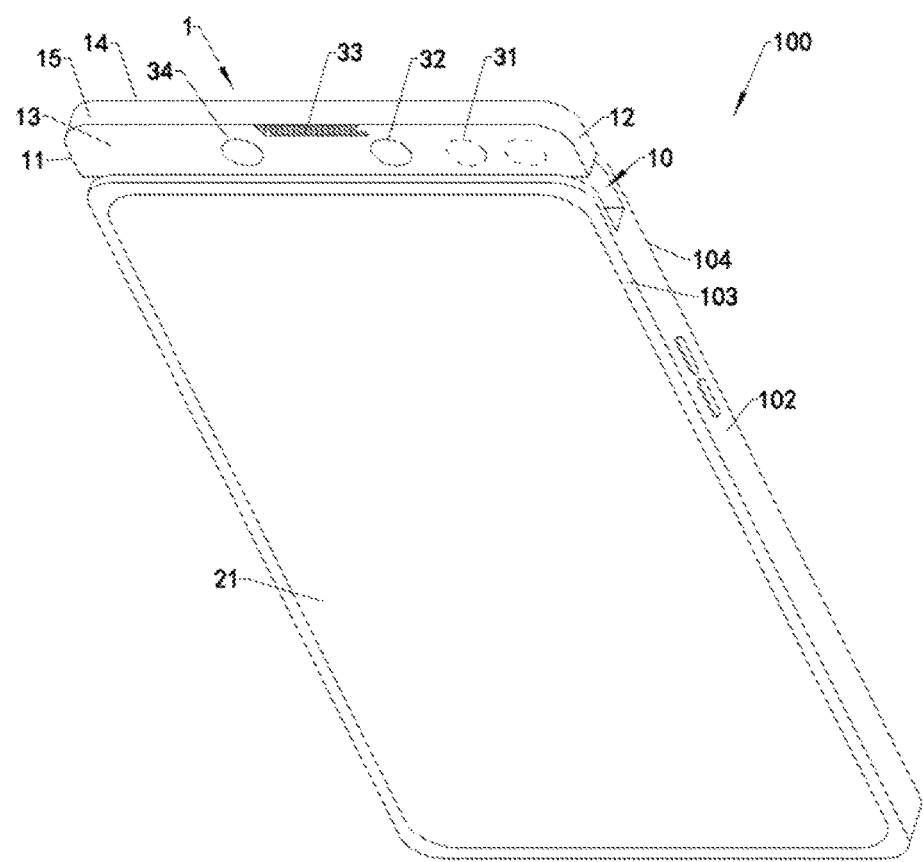
FIG. 3 is a structural view of the mobile terminal in FIG. 1, in which the mobile terminal is in another operation state.
Figure 4:
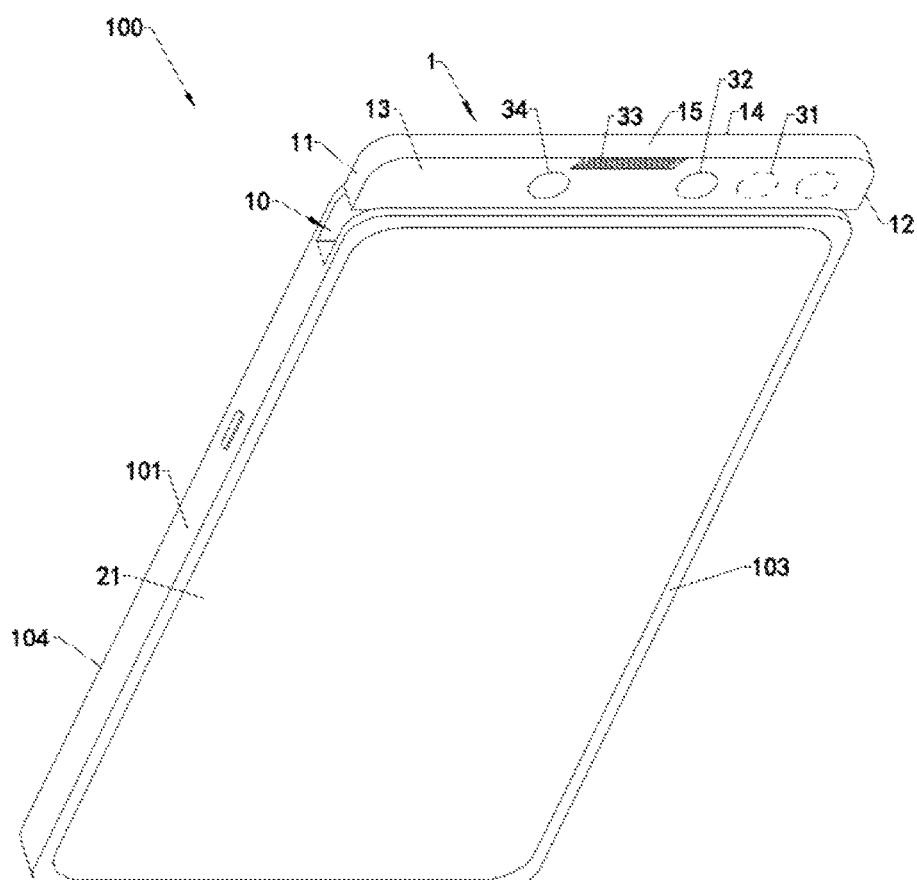
FIG. 4 is a structural view of the mobile terminal in FIG. 3 shown in another viewing angle.

In one embodiment, as shown in FIG. 3 and FIG. 4, the sliding device 1 may be further provided with at least one of functional components selected from a group comprising a second camera 32, an iris recognition module, a face recognition module, a flash, an earpiece 33 (also called as a receiver), a microphone (also called as MIC), a photoreceptor 34, and a fingerprint module. When the second camera 32 needs to perform photographing, the sliding device 1 may carry the second camera 32 to extend out of the receiving groove 10. The photographing directions respectively of the first camera 31 and the second camera 32 may be the same (either face to the front or the rear of the mobile terminal), or may be different (one faces to the front and the other faces to the rear). The functional devices (such as the earpiece 33, the photoreceptor 34, the fingerprint module, and the like) may be disposed in the sliding device 1; in this way, the functional devices may be unfolded with respect to the first screen 21 when needed, and folded with respect to the first screen 21 when not in use. That is to say, the functional devices may be covered by the first screen 21 or may be seen from the outside of the mobile terminal. Therefore, it does not need to occupy the front space of the mobile terminal 100, so that the first screen 21 may have a larger display area, and the screen ratio of the mobile terminal 100 may be increased. The functional components received in the sliding device 1 may be arranged in a misaligned manner to avoid a too large thickness of the mobile terminal 100 due to the overlapping placement.

Referring to FIGS. 5-8, when the sliding device 1 retracts into the receiving groove 10, the relative positional relationships between the sliding device 1 and the receiving groove 10 in different embodiments are different. Examples are given below.

Figure 5:
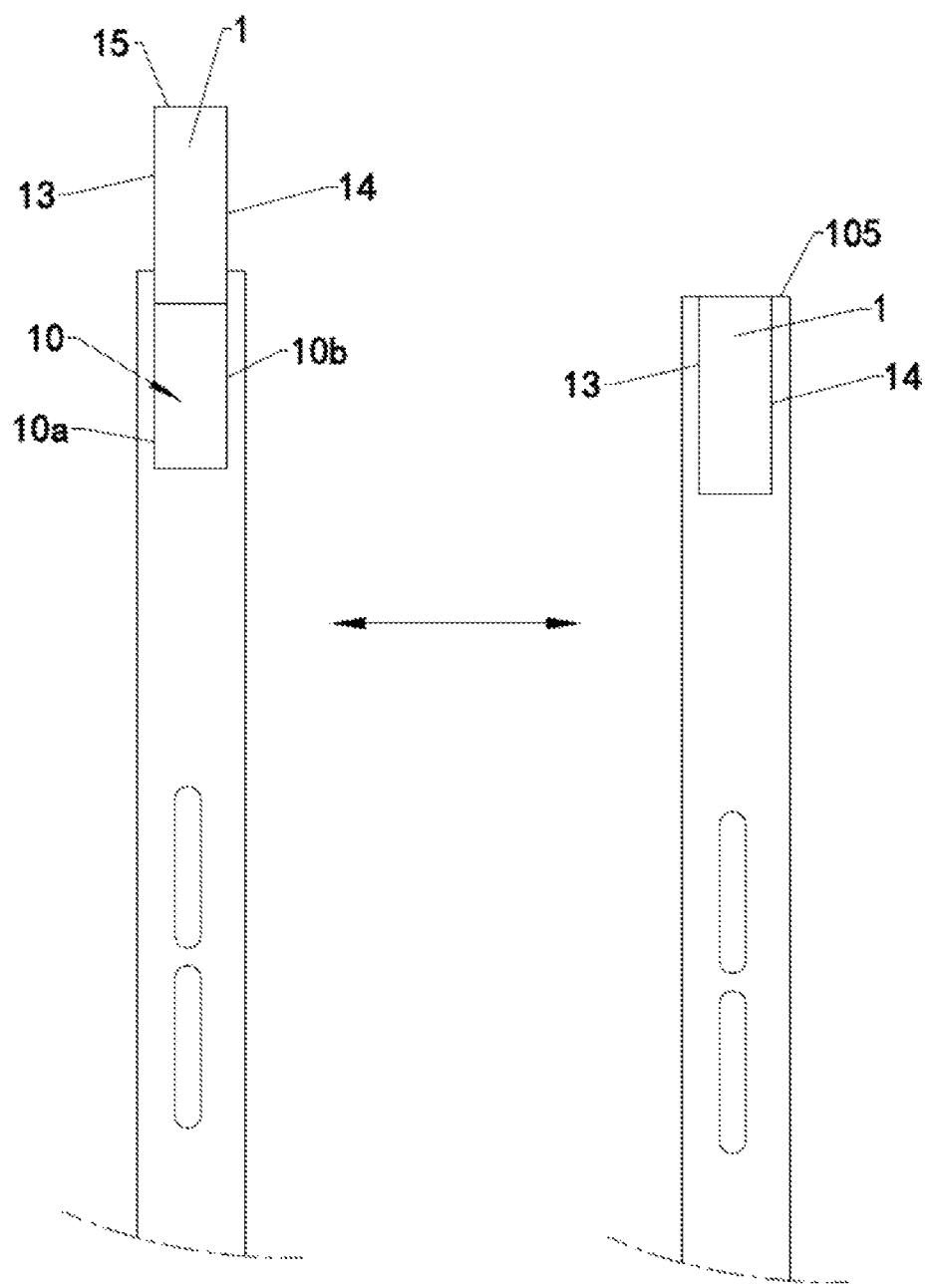
FIG. 5 is a structural view of the mobile terminal in FIG. 1, in which the mobile terminal is in a moving state.
Figure 6:
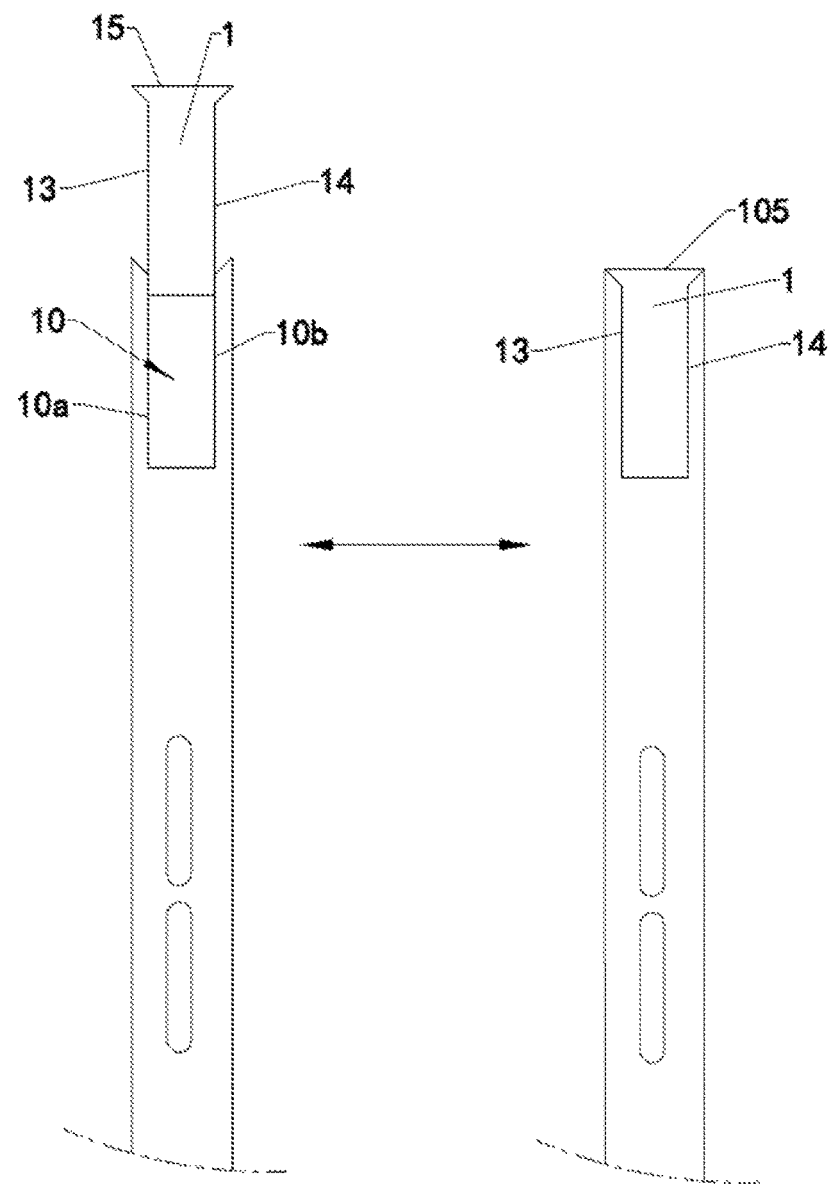
FIG. 6 is a structural view of a mobile terminal according to another embodiment of the present disclosure, wherein the mobile terminal is in a moving state.

In the first embodiment, as shown in FIG. 5 and FIG. 6, when the sliding device 1 retracts into the receiving groove 10, the front sidewall 13 and the rear sidewall 14 are both completely received in the receiving groove 10. In this case, as shown in FIG. 5, the front sidewall 13 and the rear sidewall 14 may be planar, and the front sidewall 13 and the rear sidewall 14 may be parallel to each other. When the sliding device 1 retracts into the receiving groove 10, the top wall 15 may form a part of the top face 105.

Of course, in other embodiments, both the front sidewall 13 and the rear sidewall 14 may be planar, and the front sidewall 13 may be arranged at an angle to the rear sidewall 14, and the angle may be less than or equal to 45°. Optionally, both the front sidewall 13 and the rear sidewall 14 may be curved. Optionally, as shown in FIG. 6, the front sidewall 13 may include two adjacent planes connected to each other, and the rear sidewall 14 may include two adjacent planes connected to each other. When the sliding device 1 retracts into the receiving groove 10, the top wall may form the top face 105.

In this case, a groove wall of the receiving groove 10 may include a first wall face 10a and a second wall face 10b. A shape of the first wall face 10a may match with that of the front sidewall 13. A shape of the second wall face 10b may match with that of the rear sidewall 14. When the sliding device 1 retracts into the receiving groove 10, the front sidewall 13 may contact with the first wall face 10a, and the rear sidewall 14 may contact with the second wall face 10b.

Figure 7:
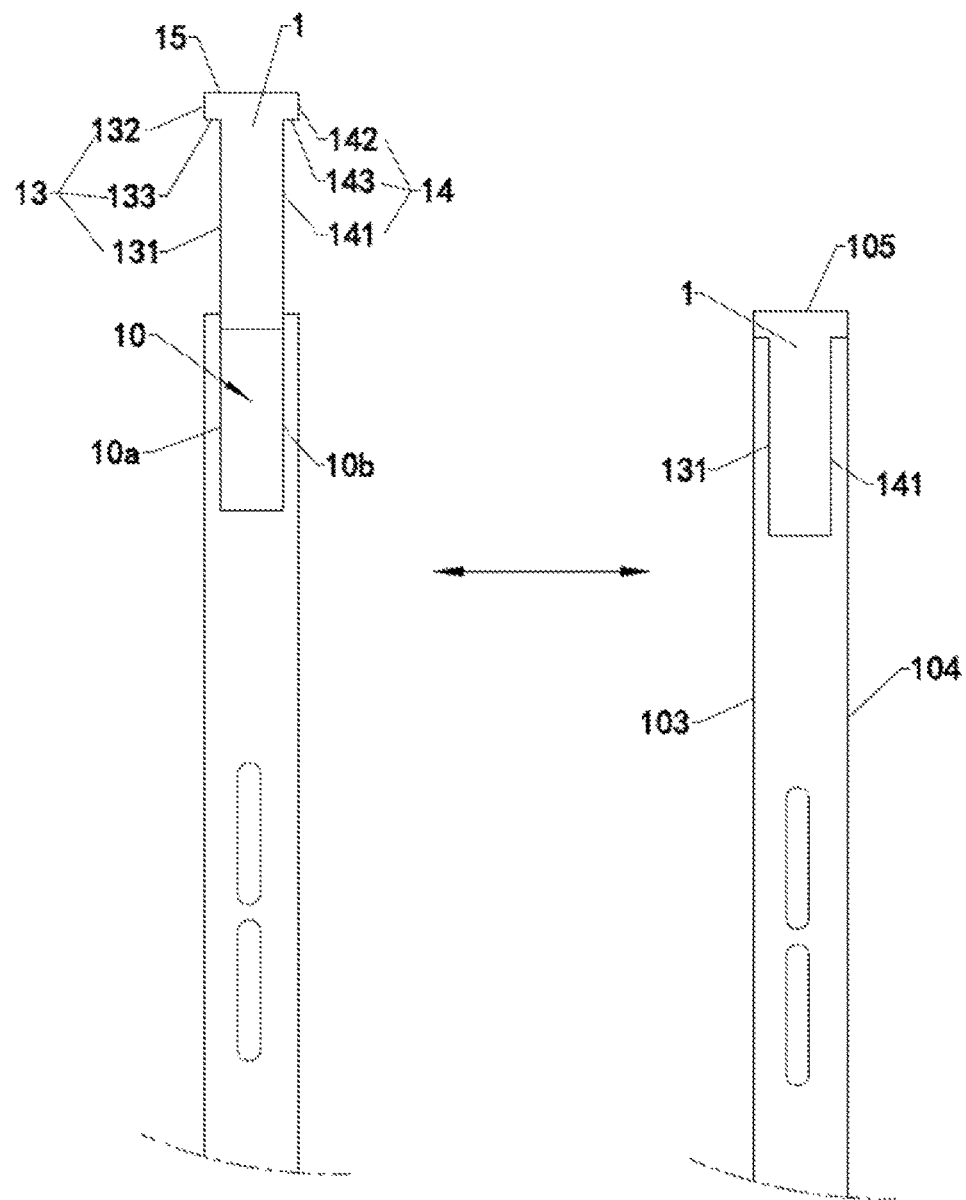
FIG. 7 is a structural view of a mobile terminal according to a further embodiment of the present disclosure, wherein the mobile terminal is in a moving state.
Figure 8:
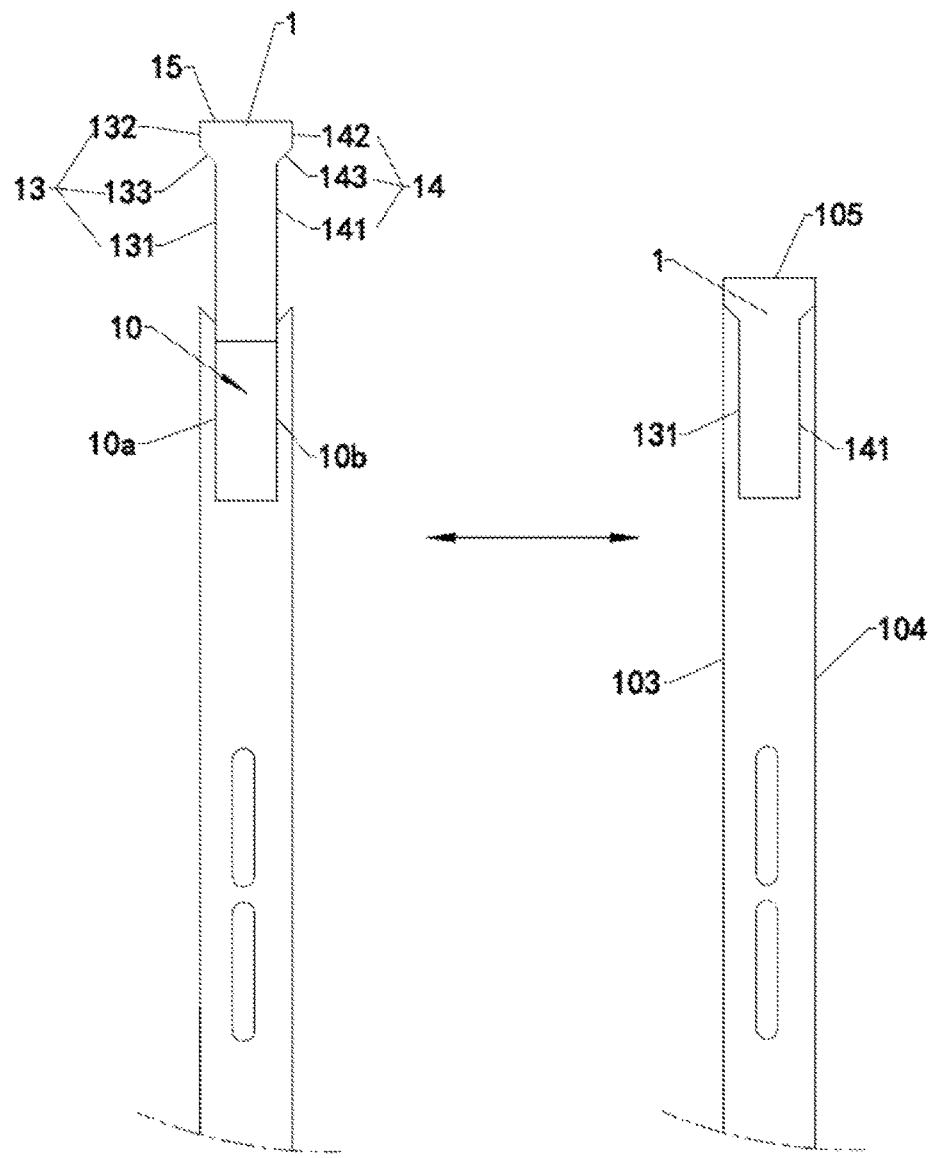
FIG. 8 is a structural view of a mobile terminal according to still a further embodiment of the present disclosure, wherein the mobile terminal is in a moving state.

In the second embodiment, as shown in FIGS. 7 and 8, the front sidewall 13 may include a first portion 131 and a second portion 132 connected to the first portion 131. When the sliding device 1 retracts into the receiving groove 10, the first portion 131 may be received in the receiving groove 10, and the second portion 132 may be located outside the receiving groove 10 and form a part of the front side face 103. The top wall 15 may form the top face 105. In other words, when the sliding device 1 retracts into the receiving groove 10, a part of the sliding device 1 may be received in the receiving groove 10 and a part of the sliding device 1 may be located outside the receiving groove 10. At this time, the user may drive the sliding device to retract into or extend out of the receiving groove 10 by clamping or pushing the second portion 132.

The front sidewall 13 may further include a third portion 133 connected between the first portion 131 and the second portion 132. The third portion 133 may extend at an angle to the first portion 131, and the angle is greater than or equal to 90° and less than 180°. For example, as shown in FIG. 7, the third portion 133 may be perpendicular to the first portion 131. Optionally, as shown in FIG. 8, the angle formed between the third portion 133 and the first portion 131 may be 135°. In the present embodiment, the third portion 133 may provide a restriction to the sliding device 1 when the sliding device 1 retracts into the receiving groove 10, so that the sliding device 1 may be positioned accurately. Besides, it is possible to prevent the sliding device 1 from excessively entering the receiving groove 10, which may prevent an impact and damage to the components inside the mobile terminal 100 due to the excessively entering of the sliding device 1.

The groove wall of the receiving groove 10 may include the first wall face 10a. If the third portion 133 is perpendicular to the first portion 131, the shape of the first wall face 10a may match with that of the first portion 131. When the sliding device 1 retracts into the receiving groove 10, the first portion 131 may contact with the first wall face 10a. However, if an obtuse angle is formed between the third portion 133 and the first portion 131, the shape of the first wall face 10a may match with the shapes respectively of the first portion 131 and the third portion 133. When the sliding device 1 retracts into the receiving groove 10, the first portion 131 and the third portion 133 may contact with the first wall face 10a.

In this case, the rear sidewall 14 may include a fourth portion 141 and a fifth portion 142. When the sliding device 1 retracts into the receiving groove 10, the fourth portion 141 may be received in the receiving groove 10, and the fifth portion 142 may be located outside the receiving groove 10 and form a part of the rear side face 104. In other words, when the sliding device 1 retracts into the receiving groove 10, a part of the sliding device 1 may be received in the receiving groove 10 and a part of the sliding device 1 may be located outside the receiving groove 10. At this time, the user may drive the sliding device to retract into or extend out of the receiving groove 10 by clamping or pushing the fifth portion 142.

The rear sidewall 14 may further include a sixth portion 143 connected between the fourth portion 141 and the fifth portion 142. The sixth portion 143 may extend at an angle to the fourth portion 141, and the angle is greater than or equal to 90° and less than 180°. For example, as shown in FIG. 7, the sixth portion 143 may be perpendicular to the fourth portion 141. Optionally, as shown in FIG. 8, the angle formed between the sixth portion 143 and the fourth portion 141 may be 135°. In the present embodiment, the sixth portion 143 may provide a restriction to the sliding device 1 when the sliding device 1 retracts into the receiving groove 10, so that the sliding device 1 may be positioned accurately. Besides, it is possible to prevent the sliding device 1 from excessively entering the receiving groove 10, which may prevent an impact and damage to the components inside the mobile terminal 100 due to the excessively entering of the sliding device 1.

The groove wall of the receiving groove 10 includes a second wall face 10b. If the sixth portion 143 is perpendicular to the fourth portion 141, the shape of the second wall face 10b may match with that of the fourth portion 141. When the sliding device 1 retracts into the receiving groove 10, the fourth portion 141 may contact with the second wall face 10b. However, if an obtuse angle is formed between the sixth portion 143 and the fourth portion 141, the shape of the second wall face 10b may match with the shapes respectively of the fourth portion 141 and the sixth portion 143. When the sliding device 1 retracts into the receiving groove 10, the fourth portion 141 and the sixth portion 143 may contact with the second wall face 10b.

Figure 9:
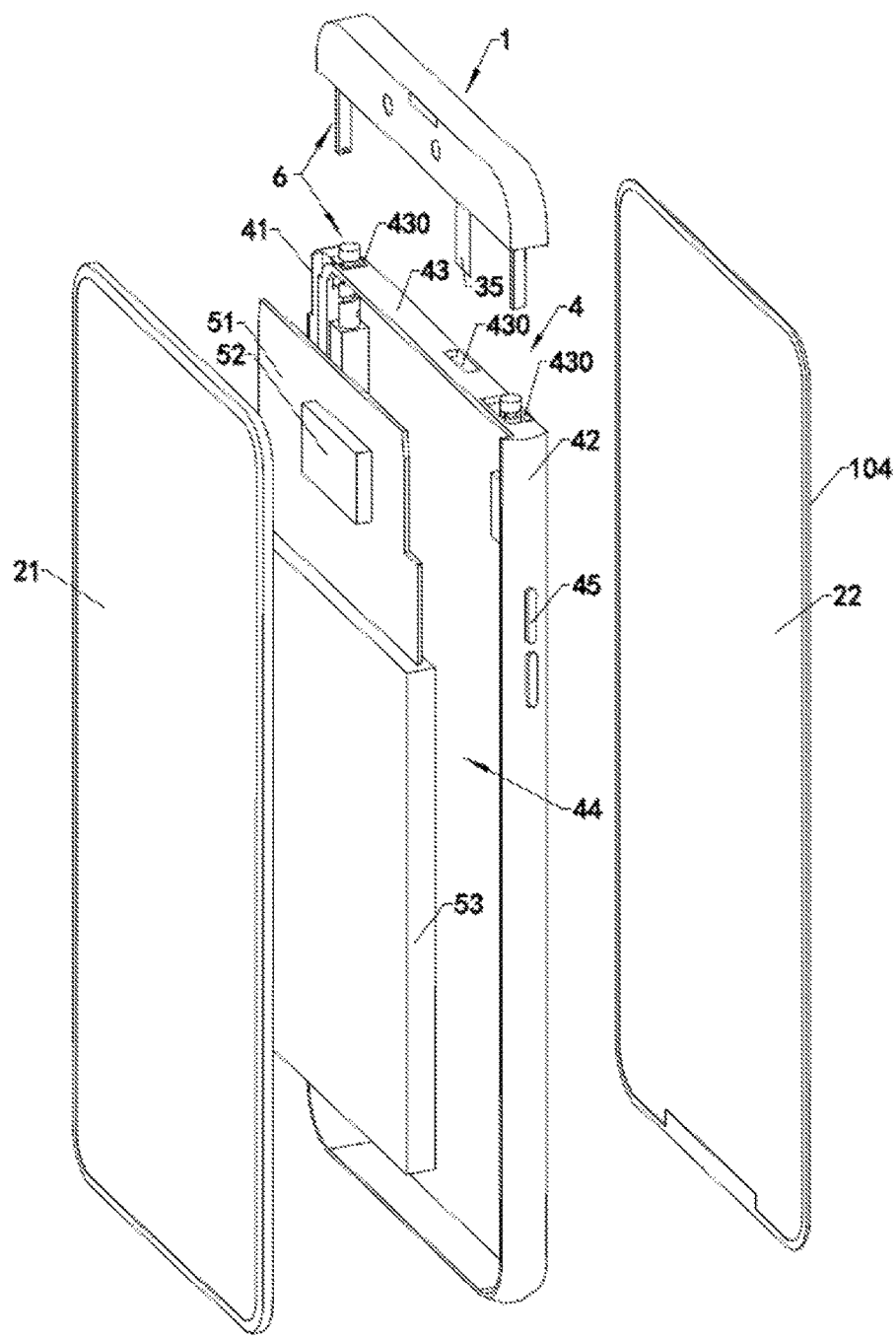
FIG. 9 is an explored view of the mobile terminal in FIG. 1.

In one embodiment, referring to FIG. 1 and FIG. 9, the mobile terminal 100 may further include a second screen 22. The second screen 22 may be disposed on the rear side face 104. The second screen 22 may be used as another screen of the mobile terminal 100, such that the mobile terminal 100 has two screens on opposite sides. The first screen 21 and the second screen 22 may both have touch and display functions.

In one embodiment, the sliding direction of the sliding device 1 may be parallel to the left side face 101. Of course, the sliding direction of the sliding device 1 may also be parallel to the right side face 102. In other words, the sliding device 1 may be retractable and slidable in the longitudinal direction of the mobile terminal 100.

In one embodiment, referring to FIGS. 1-4 and FIG. 9, the mobile terminal 100 may include a middle frame 4 connected between the first screen 21 and the second screen 22, or between the first screen 21 and the back shell. A left side 41 of the middle frame 4 may form a part of the left side face 101, and a right side 42 of the middle frame 4 may form a part of the right side face 102. The first screen 21 may be fixed to the middle frame 4. A top of the middle frame 4 may be lower than tops respectively of the front side face 101 and the rear side face 102, such that the receiving groove 10 may be located above the middle frame 4, or the receiving groove may be formed at the top of the middle frame 4. When the sliding device 1 retracts into the groove 10, the sliding device 1 may contact with or abut against the top of the middle frame 4.

The second screen 22 may be fixed to one side of the middle frame 4 that is away from the first screen 21. Of course, in other embodiments, a rear cover may also be used in the mobile terminal 100 to replace the second screen 22. The rear cover may be made of glass or metal. Optionally, the mobile terminal 100 may also have the second screen 22 and the rear cover at the same time, and the second screen 22 may be fixed to the rear cover.

When the front and rear sides of the receiving groove 10 penetrate through the middle frame 4 (that is, extend to the front and rear sides of the middle frame 4), the receiving groove 10 may be located above the middle frame 4. At this time, the first screen 21, the top of the middle frame 4, and the rear cover (or the second screen 22) may cooperatively enclose the receiving groove 10. Optionally, in other embodiments, it is possible that one or both of the front and rear sides of the receiving groove 10 do not penetrate through the front and rear sides of the middle frame 4, and the receiving groove 10 is formed at the top of the middle frame 4. For example, the front side of the receiving groove 10 may penetrate through the front side of the middle frame 4, while the rear side of the receiving groove 10 does not penetrate the rear side of the middle frame 4; in this case, the first screen 21 and the middle frame 4 may enclose the receiving groove 10. Optionally, the front side of the receiving groove 10 may not penetrate the front side of the middle frame 4, while the rear side of the receiving groove 10 may penetrate the rear side of the middle frame 4; in this case, the middle frame 4 and the rear cover (or the second screen 22) may enclose the receiving groove 10. Optionally, the front side of the receiving groove 10 may not penetrate the front side of the middle frame 4, and the rear side of the receiving groove 10 may not penetrate the rear side of the middle frame 4; in this case, the middle frame 4 may individually define the receiving groove 10.

The left side 41 of the middle frame 4 may be flush with the left sidewall 11 of the sliding device 1. The right side 42 of the middle frame 4 may be flush with the right sidewall 12 of the sliding device 1. At this time, the mobile terminal 100 may have a high appearance consistency. At the same time, it is also possible to prevent external dust, dirt, and the like from being trapped between the sliding device 1 and the middle frame 4.

Figure 10:
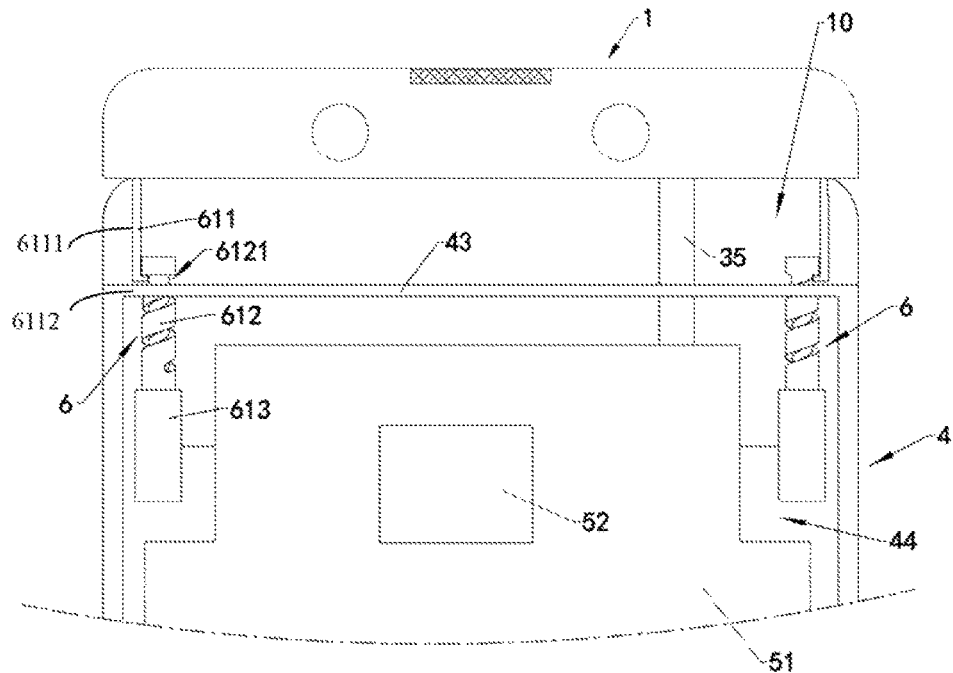
FIG. 10 is a partial view of the mobile terminal in FIG. 1.

In one embodiment, referring to FIG. 9 and FIG. 10, the middle frame 4 may include a partition wall 43 configured to divide the inner space of the mobile terminal 100 into a receiving chamber 44 and the receiving groove 10. The receiving chamber 44 may be located inside the middle frame 4. A through hole 430 may be defined in the partition wall 43; the receiving chamber 44 and the receiving groove 10 may communicate with each other through the through hole 430. A plurality of through holes 430 may be provided. The partition wall 43 may be configured to prevent dust in the external environment from entering the receiving chamber 44. Of course, in other embodiments, the receiving chamber 44 and the receiving groove 10 may also directly communicate to each other without a partition wall arranged therebetween.

In one embodiment, referring to FIG. 4 and FIG. 9, a main board 51, a processor 52 disposed on the main board SI, a battery 53 electrically connected to the main board 51, and the like may be received in the receiving chamber 44. The first screen 21 may be connected (including an electrical connection and a signal connection) to the main board 51. The first camera 31 in the sliding device 1 may be connected (including an electrical connection and a signal connection) to the main board 51 and other functional components. The mobile terminal 100 may further include a connection line 35 (such as a cable or a flexible circuit board) connected between the first camera 31 (and other functional components) and the main board 51. The connecting wire 35 may extend into the receiving chamber 44 through one of the through holes 430.

In one embodiment, referring to FIG. 9 and FIG. 10, the mobile terminal 100 may further include a driving assembly 6. A part of the driving assembly 6 may be fixed to the sliding device 1, and a part of the driving assembly 6 may be received inside the middle frame 4. In other words, a part of the drive assembly 6 may be received in the receiving chamber 44. The drive assembly 6 may be configured to drive the sliding device 1 to extend out of or retract into the receiving groove 10. The drive assembly 6 may be connected (including an electrical and a signal connections) to the main board 51. The drive assembly 6 may operate under the control of the main board 51.

A trigger button 45 may be disposed on the right side face 102. The trigger button 45 may be disposed in the middle frame 4. The trigger button 45 may be connected (including an electrical and a signal connections) to the main board 51. When a user presses or touches the trigger button 45, the trigger button 45 may send a trigger signal to the processor 52 on the main board 51, and the processor 52 may control the drive unit 6, so that the sliding device 1 may retract into or extend out of the receiving groove 10 under the control of the drive assembly 6. Of course, in other embodiments, the trigger button 45 may also be disposed on the left side face 101. Optionally, each of the left side face 101 and the right side face 102a may be provided with the trigger button 45.

In other embodiments, the trigger button 45 may be a touch icon disposed on the first screen 21 or the second screen 22. When clicking the touch icon, it is possible to send a trigger signal to the processor 52 of the main board 51. The processor 52 may receive the trigger signal and control the drive assembly 6 to drive the sliding device 1 to slide.

For example, the trigger button 45 may be a photograph-starting button and a photograph-ending button arranged on the first screen 21 or the second screen 22. When the photograph-starting button is touched, the photograph-starting button may send a first trigger signal to the processor 52 of the main board 51, and the processor 52 may receive the first trigger signal and control the driving assembly 6 to drive the sliding device 1 to extend out of the receiving groove 10, so that the first camera 31 (or the second camera 32) may perform the photographing under a photographing signal. When the photograph-ending button is touched, the photograph-ending button may send a second trigger signal to the processor 52 of the main board 51, and the processor 52 may receive the second trigger signal and control the driving assembly 6 to drive the sliding device 1 to retract into the receiving groove 10.

For example, the trigger button 45 may be a phone answering button and a phone hanging-up button arranged on the first screen 21 or the second screen 22. When the phone answering button is touched to make the phone get through, the phone answering button may send a third trigger signal to the processor 52 of the main board 51, and the processor 52 may receive the third trigger signal and control the driving assembly 6 to drive the sliding device 1 to extend out of the receiving to groove 10. When the phone is hung up by touching the phone hanging-up button, the phone hanging-up button may send a fourth trigger signal to the processor 52 of the main board 51, and the processor 52 may receive the fourth trigger signal and control the drive assembly 6 to drive the sliding device 1 to retract into the receiving groove 10.

A plurality of drive assembly 6 may be provided, and the plurality of drive assemblies 6 may be spaced apart to drive the sliding device 1 more steadily. For example, two drive assemblies 6 may be provided.

Referring to FIGS. 9-13, the driving assembly 6 may be achieved by a plurality of driving modes.

In one embodiment, as shown in FIGS. 9 and 10, the drive assembly 6 may include a sliding block 611, a lead screw 612, and a motor 613. The sliding block 611 may be fixed to the sliding device 1. The lead screw 612 and the motor 613 may be received in the middle frame 4. A periphery of the lead screw 612 may define a spiral groove 6121. The sliding block 611 may be partially embedded in the spiral groove 6121 and slidable with respect to the lead screw 612. The sliding block 611 may be substantially in shape of a strip. One end of the sliding block 611 may be fixed to the sliding device 1, and the other end of the sliding block 611 may be embedded in the spiral groove 6121. More specially, the sliding block 611 may include a connection portion 6111 fixed to the sliding device 1 and a hook portion 6112 connected to the connection portion 6111. The hook portion 6112 may be slidable along the spiral groove 6121. The motor 613 may be configured to drive the lead screw 612 to rotate, so that the sliding block 611 may carry the sliding device 1 to slide. The motor 613 may be electrically connected to the main board 51, and the processor 52 on the main board 51 may control the action of the motor 613 (including a rotation direction, a rotation speed, a rotation angle, and the like).

In this case, the motor 613 may be received in the receiving chamber 44. The lead screw 612 may be received in the receiving chamber 44. One end of the sliding block 611 may enter the receiving chamber 44 through the through hole 430 defined in the partition wall 43 to connect to the lead screw 612. In one embodiment, the lead screw 612 may also partially protrude out of the receiving chamber 44 through the through hole 430, in order to increase a stroke of the sliding device 1. A corresponding recess configured to receive a part of the lead screw 612 when the sliding device 1 retracts into the receiving groove 10 may be further defined in the sliding device 1.

When the motor 613 drives the lead screw 612 to rotate in the first direction, the sliding block 611 may be driven by the lead screw 612 to carry the sliding device 1 to slide away from the receiving chamber, such that the sliding device 1 may extend out of the receiving groove 10. When the motor 613 drives the lead screw 612 to rotate in a second direction opposite to the first direction, the sliding block 611 may be driven by the lead screw 612 to carry the sliding device 1 to slide towards the receiving chamber, such that the sliding device 1 may retract into the receiving groove 10.

Figure 11:
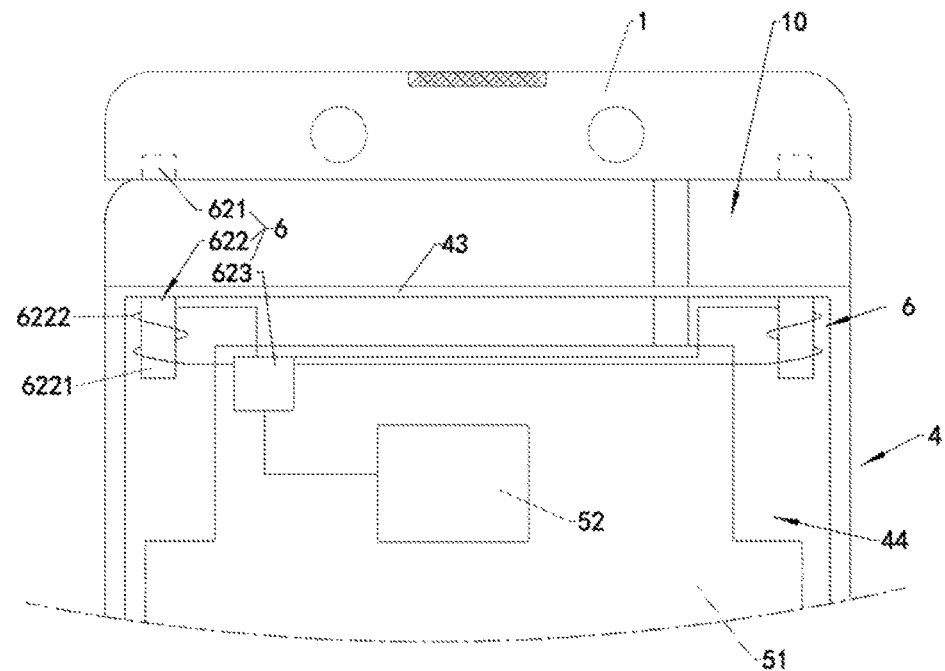
FIG. 11 is a partial view of a mobile terminal according to another embodiment of the present disclosure.

In one embodiment, as shown in FIG. 11, the drive assembly 6 may include a magnet 621, an electromagnet 622, and a controller 623. The magnet 621 may be fixed to the sliding device 1. The electromagnet 622 may be fixed in the middle frame 4. The controller 623 may be received in the middle frame 4. The controller 623 may be configured to change a magnetic field of the electromagnet 622, such that the electromagnet 622 may attract or repel the magnet 621. The electromagnet 622 may include an iron piece 6221 and a coil 6222 wound around a periphery of the iron piece 6221. The coil 6222 may be electrically connected to the controller 623. The controller 623 may change the magnetic field of the electromagnet 622 by controlling the current flow in the coil 6222.

The controller 623 may be received in the receiving chamber 44. The controller 623 may be fixed to the main board 51. The controller 623 may be electrically connected to the processor 52. The electromagnet 622 may be fixed to the partition wall 43. The electromagnet 622 may be fixed to one side of the partition wall 43 that faces towards the receiving chamber 44 or that is away from the receiving chamber 44.

When a front end of the electromagnet 622 that faces towards the magnet 621 has a same magnetic pole with an end of the magnet 621 that is away from the sliding device 1, the electromagnet 622 may repel the magnet 621, and the sliding device 1 may extend out of the receiving groove 10. When the front end of the electromagnet 622 has the magnetic pole opposite to the end of the magnet 621, the electromagnet 622 may attract the magnet 621, and the sliding device 1 may retract into the receiving groove 10.

Figure 12:
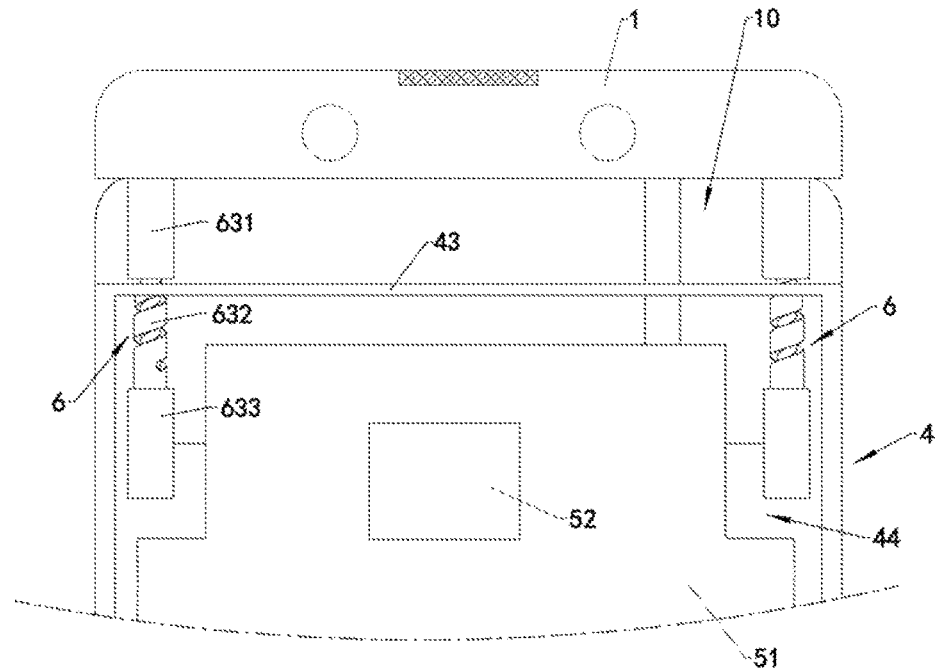
FIG. 12 is a partial view of a mobile terminal according to a further embodiment of the present disclosure.

In one embodiment, as shown in FIG. 12, the drive assembly 6 may include a sleeve 631, a transmission rod 632, and a motor 633. The sleeve 631 may be fixed to the sliding device 1. The transmission rod 632 and the motor 633 may be received in the middle frame 4. The sleeve 631 may be sleeved on a periphery of the transmission rod 632 and screwed to the transmission rod 632. The sleeve 631 may rotate with respect to the transmission rod 632, and move with respect to the middle frame 4. The motor 633 may be configured to drive the transmission rod 632 to rotate, so that the sleeve 631 may carry the sliding device 1 to slide. The motor 633 may be electrically connected to the main board 51, and the processor 52 on the main board 51 may control the action of the motor 633 (including the rotation direction, the rotation speed, the rotation angle, and the like).

In this case, the motor 633 may be received in the receiving chamber 44. The transmission rod 632 may be received in the receiving chamber 44. One end of the sleeve 631 may enter the receiving chamber 44 through a through hole defined in the partition wall 43 to connect the transmission rod 632. In an embodiment, the transmission rod 632 may also partially protrude out of the receiving chamber 44 through the through hole portion, in order to increase the stroke of the sliding device 1. A corresponding recess configured to receive a part of the transmission rod 632 when the sliding device 1 retracts into the receiving groove 10 may be further defined in the sliding device 1.

When the motor 633 drives the transmission rod 632 to rotate in the third direction, the sleeve 631 may be driven by the transmission rod 632 to carry the sliding device 1 to slide away from the receiving chamber, such that the sliding device 1 may extend out of the receiving groove 10. When the motor 633 drives the transmission rod 632 to rotate in a fourth direction opposite to the third direction, the sleeve 631 may be driven by the transmission rod 632 to carry the sliding device 1 to slide towards the receiving chamber, such that the sliding device 1 may retract into the receiving groove 10.

Figure 13:
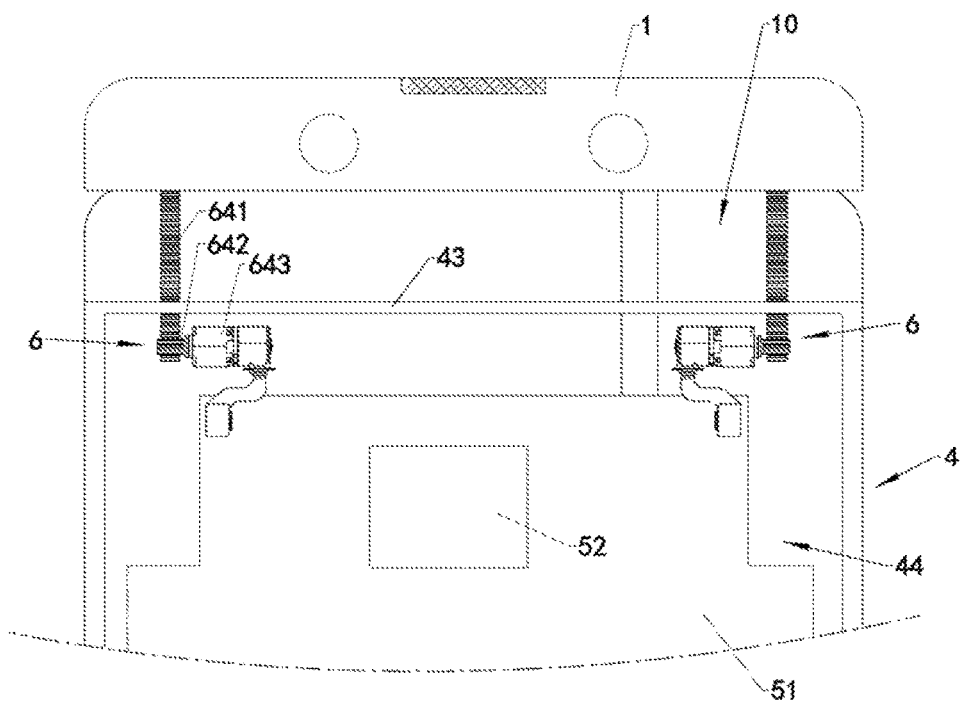
FIG. 13 is a partial view of a mobile terminal according to still a further embodiment of the present disclosure.

In one embodiment, as shown in FIG. 13, the drive assembly 6 may include a rack 641, a gear 642, and a motor

643. The rack 641 may be fixed to the sliding device 1. The gear 642 and the motor 643 may be received in the middle frame 4. The gear 642 may be engaged with the rack 641. The gear 642 may be received in the receiving chamber 44. One end of the rack 641 may be fixed to the sliding device 1, and the other end of the rack 641 may extend into the receiving chamber 44 through a through hole in the partition wall 43. The motor 643 may be received in the receiving chamber 44. The motor 643 may be configured to drive the gear 642 to rotate, such that the rack 641 may carry the sliding device 1 to slide. The motor 643 may be electrically connected to the main board 51. The processor 52 on the main board 51 may control the action of the motor 643 (including the direction of rotation, the rotational speed, the angle of rotation, and the like).

When the motor 643 drives the gear 642 to rotate in the fifth direction, the rack 641 may be driven by the gear 642 to carry the sliding device 1 to slide away from the receiving chamber, such that the sliding device 1 may extend out of the receiving groove 10. When the motor 643 drives the gear 642 to rotate in a sixth direction opposite to the fifth direction, the rack 641 may be driven by the gear 642 to carry the sliding device 1 to slide towards the receiving chamber, such that the sliding device 1 may retract into the receiving groove 10.

In some embodiments, as shown in FIGS. 1-4, the mobile terminal may include a front shell, a back shell opposite to the front shell, a screen 21 mounted on the front shell, a frame 4, a slidable device 1, and a camera 31. The frame 4 may include a pair of spaced and parallel external walls 41 and 42 engaged with the front shell and the back shell. Each of the external walls 41 and 42 may have a top lower than tops of the front shell and the back shell. The tops respectively of the external walls 41 and 42, the front shell and the back shell cooperatively define a storage space 10. The slidable device 1 may be received in the storage space 10 and configured to move between a first position at which the slidable device 1 extends out of the storage space 10 and a second position at which the slidable device 1 retracts into the storage space 10. The camera 31 may be arranged on the slidable device 1. When the slidable device 1 is at the first position, the camera 31 may be exposed out of the storage space 10. However, when the slidable device 1 is at the second position, the camera 31 may be received in the storage space 10 and covered by the screen 21.

In some embodiments, the frame 4 further comprises a partition wall 43 connected between the pair of external walls 41 and 42. The partition wall 43, the tops respectively of the external walls 41 and 42, the front shell and the back shell may cooperatively define the storage space 10.

In some embodiments, the sliding device 1 may include a front 13 and a rear 14 opposite to each other. When the sliding device 1 is at the second position, the front 13 and the rear 14 may be both completely received in the storage space 10.

In some embodiments, the sliding device 1 may include an embedding portion 131, 141 and a protruding portion 132, 142 connected to the embedding portion 131, 141. The embedding portion 131, 141 may be received in the storage space 10, while the protruding portion 132, 142 may protrude out of the storage space 10. When the sliding device 1 is at the second position, the protruding portion 132, 142 may abut against the tops respectively of the front shell and the back shell.

In some embodiments, the sliding device 1 may further include a restricting portion 133, 143 connected between the embedding portion and the protruding portion. The restricting portion 133, 143 may extend at an angle from the embedding portion, and the angle is greater than or equal to 90 and less than 180°.

In some embodiments, an electronic apparatus may be further provided. As shown in FIGS. 1-4, the electronic apparatus may include a front shell, a back shell opposite to the front shell, a screen 21 mounted on the front shell and having a display area, a frame 4, a slidable device 1, and a camera 31. The frame 4 may include a pair of spaced and parallel external walls 41 and 42 engaged with the front shell and the back shell to enclose a receiving chamber 44. Each of the external walls 41 and 42 may have a top lower than tops of the front shell and the back shell. A partition wall 43 may be connected between the pair of external walls 41 and 42. In this case, the front shell, the back shell and the partition wall 43 cooperatively define a storage space 10. The slidable device 1 may be received in the storage space 10 and configured to move between a first position at which the slidable device 1 extends out of the storage space 10 and a second position at which the slidable device 1 retracts into the storage space 10. The camera 31 may be arranged on the slidable device 1. When the slidable device 1 is at the first position, the camera 31 may be exposed out of the storage space 10. However, when the slidable device 1 is at the second position, the camera 31 may be received in the storage space 10 and covered by the screen 21. The electronic apparatus may further includes a driving mechanism 6. The driving mechanism 6 may be partially received in the receiving chamber 44 and configured to drive the slidable device 1 with the camera 31 to move between the first position and the second position.

The embodiments of the present disclosure have been described in detail above, and the principles and implementations of the present disclosure are described in the specific examples. The description of the above embodiments is only used to help with the understanding of the method of the present disclosure and its core ideas. Those skilled in the art may make modification in the specific embodiments and the scope of the present disclosure based on the idea of the present disclosure. In summary, the content of the present disclosure should not be construed as a limitation to the present disclosure.

What is claimed is:

1. A mobile terminal, comprising:
   a left side face and a right side face opposite to each other,
   a front side face and a rear side face opposite to each other; both the front side face and the rear side face being connected between the left side face and the right side face;
   a top face, connected between the front side face and the rear side face, and between the left side face and the right side face;
   a receiving groove, defined between the front side face and the rear side face, and penetrating from the left side face to the right side face;
   a sliding device, retractable and slidable with respect to the receiving groove; wherein the sliding device comprises:
      a left sidewall and a right sidewall opposite to each other;
      a front sidewall and a rear sidewall opposite to each other; both the front sidewall and the rear sidewall being connected between the left sidewall and the right sidewall; and
      a top wall, connected between the front sidewall and the rear sidewall, and between the left sidewall and the right sidewall;

a first screen, arranged on the front side face; and
a first camera, arranged on the sliding device;
wherein when the sliding device carries the first camera to retract into the receiving groove, the top wall forms at least a part of the top face, the left sidewall forms a part of the left side face, and the right sidewall forms a part of the right side face; when the sliding device carries the first camera to extend out of the receiving groove, an image capturing surface of the first camera is capable of being exposed out of the receiving groove.

2. The mobile terminal of claim 1, wherein at least one of a second camera, an iris recognition module, a face recognition module, a flash, a microphone, a photoreceptor, and a fingerprint module is disposed on the sliding device.

3. The mobile terminal of claim 1, wherein when the sliding device retracts into the receiving groove, the front sidewall and the rear sidewall are both completely received in the receiving groove.

4. The mobile terminal of claim 1, wherein the front sidewall comprises a first portion and a second portion connected to the first portion:
when sliding device retracts into the receiving groove, the first portion is to received in the receiving groove, while the second portion is located outside the receiving groove and forms a part of the front side face.

5. The mobile terminal of claim 4, wherein the front sidewall further comprises a third portion connected between the first portion and the second portion, the third portion extends at an angle to the first potion, and the angle is greater than or equal to 90° and less than 180.

6. The mobile terminal of claim 1, wherein the mobile terminal further comprises a second screen or a rear cover disposed on the rear side face.

7. The mobile terminal of claim 6, further comprising a middle frame connected between the first screen and the second screen or between the first screen and the rear cover; wherein a left side of the middle frame forms a part of the left side face, and a right side of the middle frame forms a part of the right side face; the first screen is fixed to the middle frame; the receiving groove is defined by the first screen, the second screen and a top of the middle frame, or defined by the first screen, the rear cover and the top of the middle frame.

8. The mobile terminal of claim 7, wherein the middle frame comprises a partition wall connected between the left side and the right side and close to the top face; the receiving groove is defined by the first screen, the second screen and the partition wall, or defined by the first screen, the rear cover and the partition wall.

9. The mobile terminal of claim 7, wherein the left side of the middle frame is flush with the left sidewall, and the right side of the middle frame is flush with the right sidewall.

10. The mobile terminal of claim 7, further comprising a driving assembly; wherein a part of the driving assembly is fixed to the sliding device, and a part of the driving assembly is received inside the middle frame; the driving assembly is configured to drive the sliding device to extend out of or retract into the receiving groove.

11. The mobile terminal of claim 10, wherein the driving assembly comprises:
a sliding block, fixed to the sliding device;
a lead screw, received in the middle frame, wherein a periphery of the lead screw defines a spiral groove, and the sliding block is partially embedded in the spiral groove and slidable with respect to the lead screw; and
a motor, received in the middle frame and configured to drive the lead screw to rotate, such that the sliding block is capable of carrying the sliding device to slide.

12. The mobile terminal of claim 10, wherein the driving assembly comprises:
a magnet, fixed on the sliding device;
an electromagnet, fixed in the middle frame; and
a controller, received in the middle frame and configured to change a magnetic field of the electromagnet, such that the electromagnet attracts or repels the electromagnet.

13. The mobile terminal of claim 10, wherein the driving assembly comprises:
a transmission rod, received in the middle frame;
a sleeve, fixed to the sliding device, and sleeved on a periphery of the transmission rod and screwed to the transmission rod; and
a motor, received in the middle frame and configured to drive the transmission rod to rotate, such that the sleeve is capable of carrying the sliding device to slide.

14. The mobile terminal of claim 10, wherein the driving assembly comprises:
a rack, fixed to the sliding device;
a gear, received in the middle frame and engaged with the rack; and
a motor, received in the middle frame and configured to drive the gear to rotate, such that the rack is capable of carrying the sliding device to slide.

15. A mobile terminal, comprising:
a front shell,
a back shell, opposite to the front shell;
a screen, mounted on the front shell;
a frame, comprising a pair of spaced and parallel external walls engaged with the front shell and the back shell; wherein each of the external walls has a top lower than tops of the front shell and the back shell; the tops respectively of the external walls, the front shell and the back shell cooperatively define a storage space;
a slidable device, received in the storage space and configured to move between a first position at which the slidable device extends out of the storage space and a second position at which the slidable device retracts into the storage space; and
a camera, arranged on the slidable device; wherein when the slidable device is at the first position, the camera is exposed out of the storage space; when the slidable device is at the second position, the camera is received in the storage space and covered by the screen.

16. The mobile terminal of claim 15, wherein the frame further comprises a partition wall connected between the pair of external walls; the partition wall, the tops respectively of the external walls, the front shell and the back shell cooperatively define the storage space.

17. The mobile terminal of claim 16, wherein the sliding device comprises a front and a rear opposite to each other when the sliding device is at the second position, the front and the rear are both completely received in the storage space.

18. The mobile terminal of claim 16, wherein the sliding device comprises an embedding portion and a protruding portion connected to the embedding portion; the embedding portion is received in the storage space, while the protruding portion protrudes out of the storage space; when the sliding device is at the second position, the protruding portion abuts against the tops respectively of the front shell and the back shell.

19. The mobile terminal of claim 18, wherein the sliding device further comprises a restricting portion connected between the embedding portion and the protruding portion; the restricting portion extends at an angle from the embedding portion, and the angle is greater than or equal to 90° and less than 180°.

20. An electronic apparatus, comprising:

a front shell, a back shell, opposite to the front shell;

a screen, mounted on the front shell and having a display area;

a frame, comprising:

a pair of spaced and parallel external walls engaged with the front shell and the back shell to enclose a receiving chamber, wherein each of the external walls has a top lower than tops of the front shell and the back shell; and a partition wall connected between the pair of external walls; wherein the front shell, the back shell and the partition wall cooperatively define a storage space;

a slidable device, received in the storage space and configured to move between a first position at which the slidable device extends out of the storage space and a second position at which the slidable device retracts into the storage space;

a camera, arranged on the slidable device; wherein when the slidable device is at the first position, the camera is exposed out of the storage space; when the slidable device is at the second position, the camera is received in the storage space and covered by the display area; and a driving mechanism, partially received in the receiving chamber and configured to drive the slidable device with the camera to move between the first position and the second position.

\* \* \* \* \*